(12) United States Patent
Vaisanen

(10) Patent No.: US 7,198,126 B2
(45) Date of Patent: Apr. 3, 2007

(54) FRONT SUSPENSION FOR RECREATIONAL VEHICLE

(75) Inventor: Esa Vaisanen, Rovaniemi (FI)

(73) Assignee: BRP Finland Oy, Rovaniemi (FI)

( * ) Notice: Subject to any disclaimer, the term of this patent is extended or adjusted under 35 U.S.C. 154(b) by 0 days.

(21) Appl. No.: 11/295,512

(22) Filed: Dec. 7, 2005

(65) Prior Publication Data
US 2006/0081407 A1 Apr. 20, 2006

Related U.S. Application Data

(63) Continuation of application No. 10/921,093, filed on Aug. 19, 2004, now Pat. No. 6,976,550.

(60) Provisional application No. 60/497,322, filed on Aug. 25, 2003.

(51) Int. Cl.
B62M 27/02 (2006.01)

(52) U.S. Cl. ...................... 180/182; 180/190

(58) Field of Classification Search ............... 180/190, 180/191, 182–186; 280/21.1, 16, 17, 22, 280/22.1, 14.26, 124.128, 124.148, 124.145
See application file for complete search history.

(56) References Cited

U.S. PATENT DOCUMENTS

| | | | |
|---|---|---|---|
| 3,883,152 A | 5/1975 | De Carbon | |
| 4,591,184 A | 5/1986 | Matschinski | |
| 5,033,572 A | 7/1991 | Zulawski | |
| 5,038,882 A | 8/1991 | Zulawski | |
| 5,503,242 A | 4/1996 | Jeffers | |
| 5,957,230 A * | 9/1999 | Harano et al. | 180/68.4 |
| 6,009,966 A | 1/2000 | Olson et al. | |
| 6,199,649 B1 | 3/2001 | Alanko | |
| 6,234,264 B1 | 5/2001 | Boivin et al. | |
| 6,311,798 B1 * | 11/2001 | Anderson | 180/182 |
| 6,474,662 B1 | 11/2002 | Cormican | |
| 6,561,302 B2 | 5/2003 | Karpik | |
| 6,655,487 B2 | 12/2003 | Mallette et al. | |
| 6,691,812 B2 | 2/2004 | Karpik | |
| 6,860,352 B2 | 3/2005 | Mallette | |
| 6,942,050 B1 | 9/2005 | Honkala | |

OTHER PUBLICATIONS

Lynx 2002 Line Up Brochure, pp. 4 & 7.

* cited by examiner

*Primary Examiner*—Tony Winner
(74) *Attorney, Agent, or Firm*—Osler, Hoskin & Harcourt LLP (57) ABSTRACT

A front suspension system for a recreational vehicle such as a snowmobile has a lower A-arm assembly and an upper suspension arm for connecting each front ski to the chassis of the recreational vehicle. The lower A-arm restrains the front ski from moving backward or laterally while the upper arm connects to the top of the spindle to ensure that the spindle remains substantially vertical when the front ski encounters a bump.

23 Claims, 9 Drawing Sheets

FRONT SUSPENSION FOR RECREATIONAL VEHICLE

CROSS-REFERENCE TO RELATED APPLICATIONS

This application is a continuation of U.S. application Ser. No. 10/921,093 filed on Aug. 19, 2004 now U.S. Pat. No. 6,976,550. Through the '093 application, the present application also claims the benefit of priority to U.S. provisional application 60/497,322 filed on Aug. 25, 2003, the contents of both applications are incorporated herein by reference.

TECHNICAL FIELD

The present invention relates generally to front suspension systems and, in particular, to front suspensions for recreational vehicles such as snowmobiles.

BACKGROUND OF THE INVENTION

Figure 1:
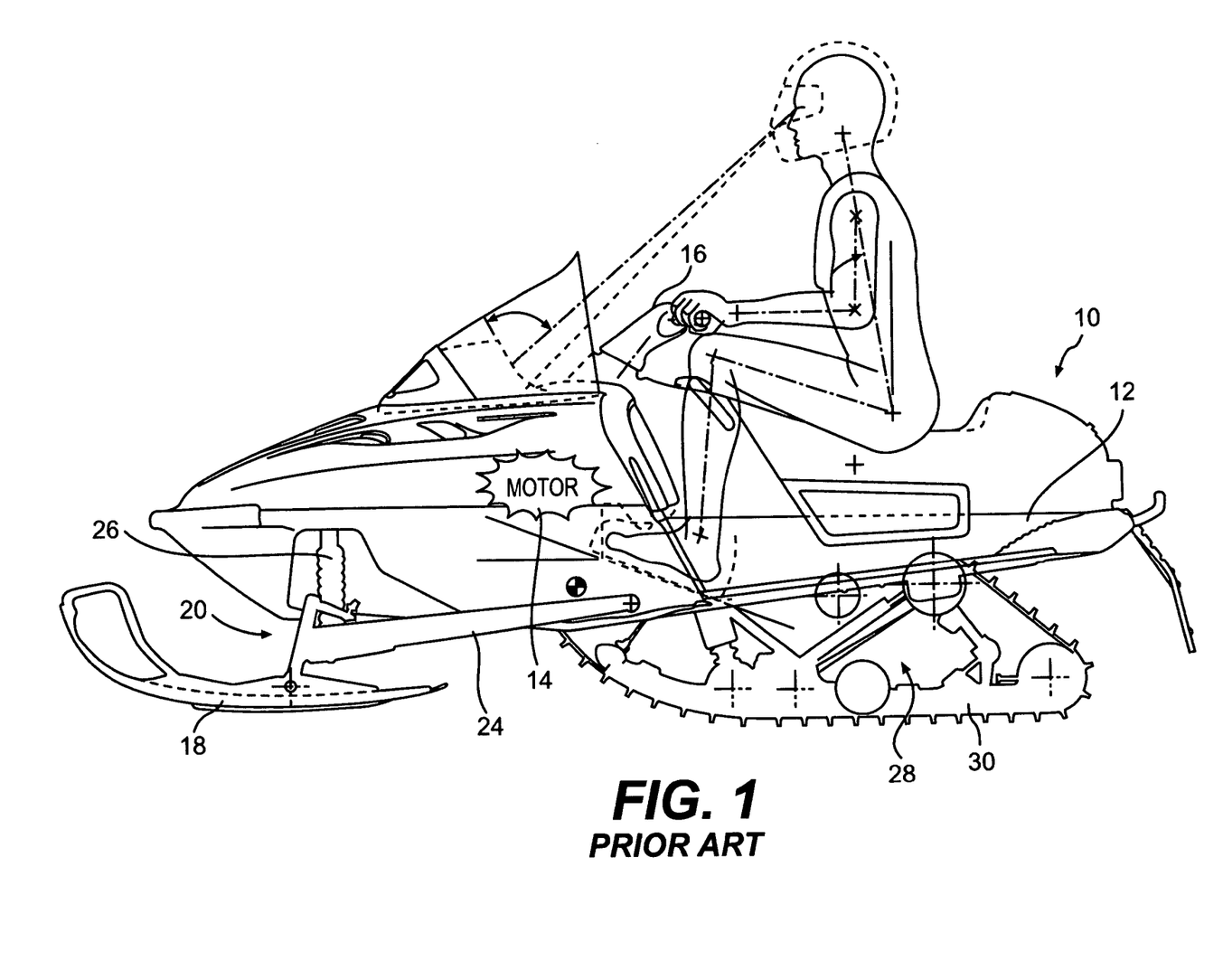
FIG. 1 is a side elevation view of a prior art snowmobile equipped with a swing-arm type front suspension system.

As illustrated in FIG. 1, a typical prior-art snowmobile 10 has a chassis or frame 12 and a motor 14 mounted to the chassis. The motor 14 may be either a two-stroke or four-stroke internal combustion engine. The motor 14 is connected via a power-transmission system (not shown) to an endless track 30 which is mounted around a rear suspension system 28. Handlebars 16 are provided for steering the snowmobile. The handlebars 16 are linked via a steering linkage assembly (not shown in FIG. 1) to a pair of front skis 18. Each front ski 18 is connected to a front suspension system 20. The front suspension system 20 includes a swing arm 24 on each side of the snowmobile 10. The swing arm 24 is connected to the chassis 12 and to the front suspension system 20. The front suspension system 20 also includes a shock absorber assembly 26 for each front ski 18.

There are two types of front suspension systems that are commonly used on snowmobiles. The first type is known as the swing-arm type front suspension. The second type is known as the double A-arm front suspension.

Figure 2:
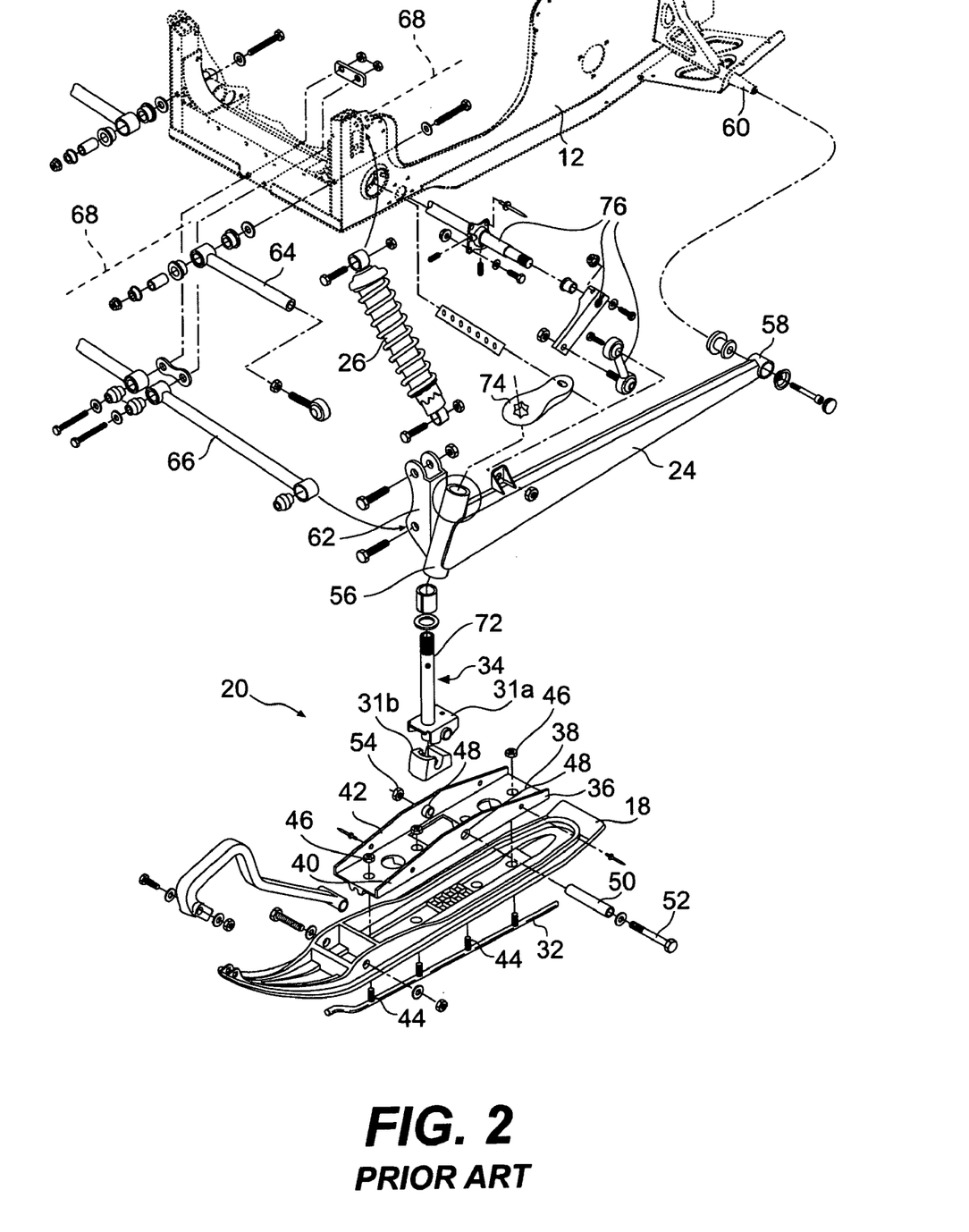
FIG. 2 is an exploded isometric perspective view of a swing-arm type front suspension system as found in the prior art.

As illustrated in FIG. 2, the swing-arm-type suspension system has a swing arm 24. The swing arm 24 is pivotally mounted to the chassis 12 of the snowmobile. A rear portion of the swing arm 24 has a pivot collar 58 which pivotally connects to a chassis pin 60 which protrudes transversely from a side portion of the chassis. A front portion of the swing arm 24 has a tubular, cylindrical spindle holder 56 whose inner diameter is dimensioned to receive a spindle 34. A plurality of splines 72 is located at the top of the spindle 34. The splines engage with a star-shaped aperture in a steering arm 74. The steering arm 74 is connected via a steering linkage assembly 76 to a steering column (not shown). Also affixed to the cylindrical spindle holder 56 (at the front portion of the swing arm 24) is a bracket 62. The bracket 62 fastens to a bottom rod eye of a shock absorber 26 while the top of the shock absorber is fastened to the chassis 12. The bracket 62 also has attachment points for an upper suspension arm 64 and a lower suspension arm 66. The upper suspension arm 64 and the lower suspension arm 66 are both pivotally connected to the chassis 12 and are also pivotally connected to the bracket 62. The upper suspension arm pivots about an axis that is parallel to the centerline 68 of the snowmobile. Likewise, the lower suspension arm pivots about an axis that is parallel to the centerline 68 of the snowmobile.

Still referring to FIG. 2, the spindle 34 connected to the front ski 18 via a bridge-shaped bracket 36. The bridge-shaped bracket 36 is an elongated U-shaped structure with a bottom portion 38 connected to two upwardly extending side portions 40, 42. The bottom portion 38 of the bridge-shaped bracket 36 is adapted to fit onto the front ski 18. The bridge-shaped bracket 36 has four holes that receive four respective threaded studs 44 that extend upward from a runner 32 that lies underneath the front ski 18. Nuts 46 are tightened onto the threaded studs to fasten the bridge-shaped bracket 36 to the front ski 18. Each side portion 40, 42 of the bridge-shaped bracket 36 has a hole 48 through which a spacer 50 may be inserted. There are corresponding holes on the sides of the pivoting bracket 31a. The spacer 50 is tubular so that a bolt 52 may be inserted inside the spacer. The bottom portion of the spindle 34 is welded to a pivoting bracket 31a which pivots on a bottom bracket 31b. The bottom bracket 31b is affixed to the front ski 18. The pivoting bracket 31a is pivotally fastened to the bridge-shaped bracket 36 by the bolt 52, spacer 50 and nut 54. When the spacer 50 is inserted in the holes 48 and through the corresponding holes of the pivoting bracket 31a, the spacer 50 restrains the pivoting bracket 31a. The pivoting bracket and the spindle 34 may then rotate in a semi-circular recess located in the bottom bracket 31b. This permits the spindle 34 to pivot with respect to the front ski 18.

In operation, when the snowmobile 10 encounters a bump, the swing arm 24 will rotate about the chassis pin 60. The upper suspension arm 64 and the lower suspension arm 66 act to constrain the motion of the swing arm 24 while the shock absorber assembly 26 acts to dampen the motion by absorbing and dissipating energy. As the swing arm moves, the spindle 34 will pivot with respect to the front ski 18 by virtue of the brackets 31a, 31b.

One shortcoming of the swing-arm suspension system is that it is quite heavy. Another shortcoming of the swing-arm suspension system is that the swing arm is oriented at a downward angle relative to the horizontal plane. This downward angle is necessary to provide sufficient ground clearance for the front of the vehicle. Since the swing arm is angled downwardly, the spindle and the front ski must first travel in the forward direction when the front ski encounters a bump. In other words, in order for the front suspension system to compress, the front ski must move forward before it can move upward. Since the vehicle is usually moving forward when it encounters a bump, this forward movement of the front ski augments the impact on the chassis and thus results in rider discomfort.

Figure 3:
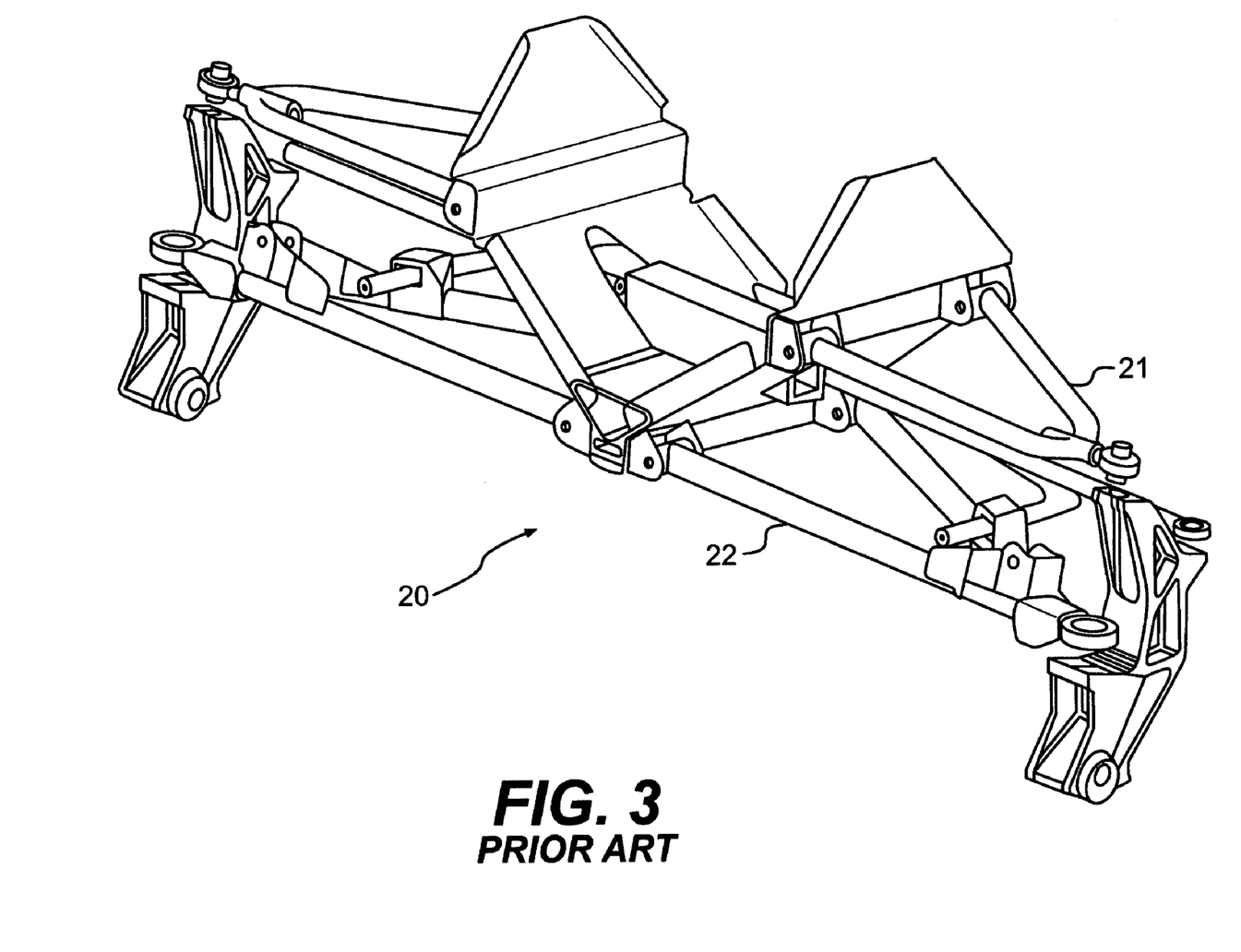
FIG. 3 is an isometric perspective view of a double A-arm front suspension system as found in the prior art.

As noted above, a second type of front suspension system that is well known in the art is the double A-arm suspension. As illustrated in FIG. 3, a double A-arm front suspension system 20 has an upper A-arm assembly 21 and a lower A-arm assembly 22. The upper and lower A-arm assemblies 21, 22 work together to ensure that the front ski 18 and the spindle 34 move vertically when the front ski 18 encounters a bump. Unlike the swing-arm suspension, the front ski 18 and spindle 34 do not have to move forward in order to move upward. Thus, rider comfort is improved vis-à-vis the swing-arm design. However, the double A-arm design is also heavy. Furthermore, the double A-arm design is costly to manufacture because of the number of parts and their complexity.

There is therefore a need for an improved front suspension system that is lighter than the prior art suspensions and that is less expensive and easier to construct.

SUMMARY OF THE INVENTION

It is therefore an object of the present invention to provide an improved front suspension system that is lighter, less expensive and easier to construct than the suspension systems known in the art.

The present invention therefore provides a front suspension system for connecting a ground-contacting portion of a recreational vehicle to a chassis of the recreational vehicle, the front suspension system comprising:
an A-arm assembly having:
   a first member pivotally connected at a proximal end to the chassis and at a distal end to the ground-contacting portion; and
   a second member pivotally connected at a proximal end to the chassis and at a distal end to the ground-contacting portion; and
a lone suspension arm disposed above the A-arm assembly, the suspension arm being pivotally connected at a proximal end to the chassis and at a distal end to the ground-contacting portion.

The invention further provides a snowmobile including a chassis, an engine mounted to the chassis, the engine driving an endless track to propel the snowmobile, a rear suspension system disposed within the endless track, and at least one front ski assembly, each front ski assembly being connected to the chassis by a front suspension system, the front suspension system comprising:
an A-arm assembly having:
   a first member pivotally connected at a proximal end to the chassis and at a distal end to the front ski assembly; and
   a second member pivotally connected at a proximal end to the chassis and at a distal end to the front ski assembly; and
a lone suspension arm disposed above the A-arm assembly, the suspension arm being pivotally connected at a proximal end to the chassis and at a distal end to the front ski assembly.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF PREFERRED EMBODIMENTS

In general, and as will be elaborated below, a front suspension system for a recreational vehicle such as a snowmobile has a lower A-arm assembly and an upper suspension arm for connecting each front ski to a chassis of the recreational vehicle. The lower A-arm restrains the front ski from moving backward or laterally while the upper arm connects to a top of a spindle assembly to ensure that a spindle remains substantially vertical when the front ski encounters a bump.

FIGS. 4, 5, 6 and 7 illustrate an embodiment of the present invention, namely a front suspension system for a recreational vehicle.

Figure 4:
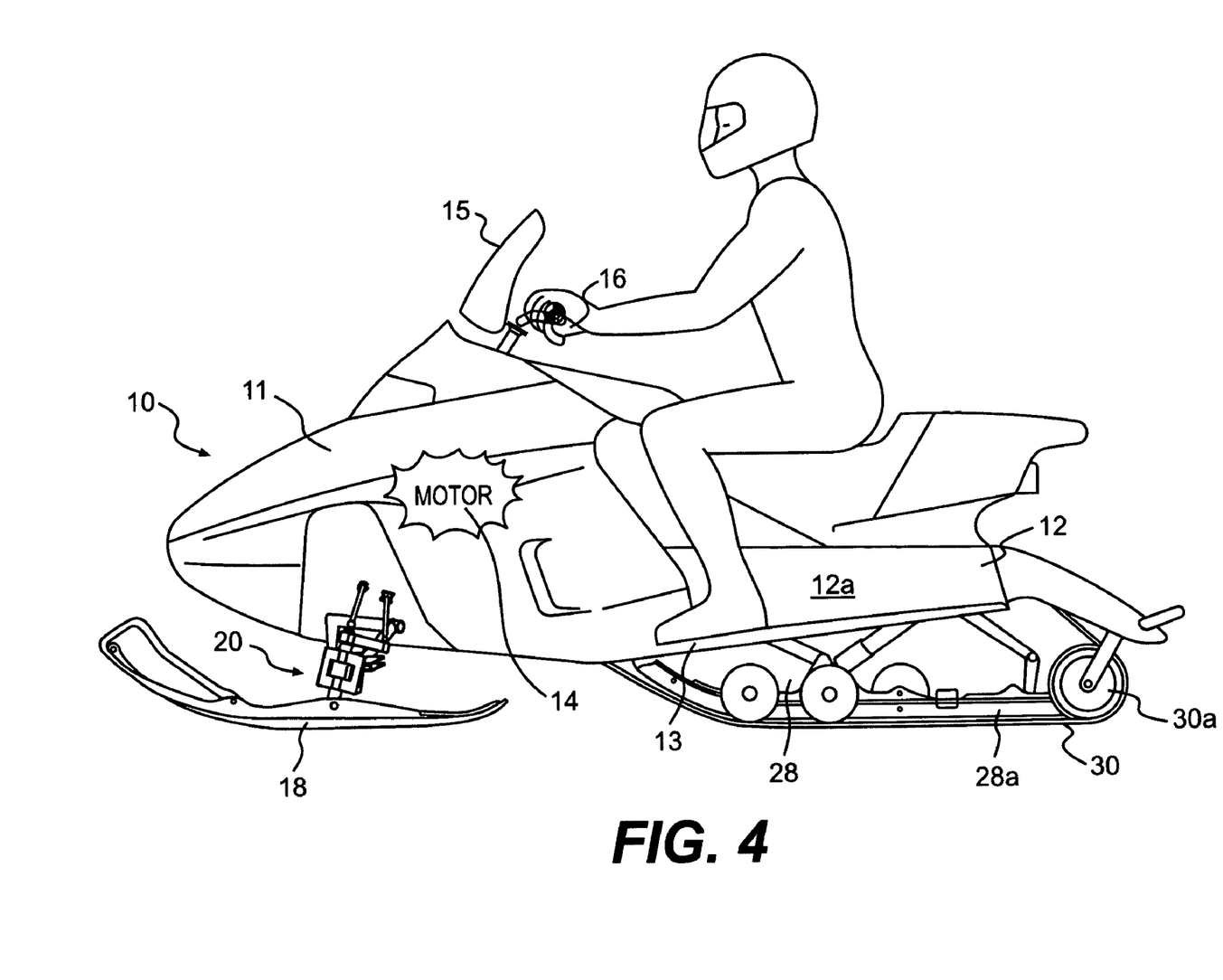
FIG. 4 is a side elevation view of a snowmobile equipped with a front suspension system in accordance with an embodiment of the present invention.

As depicted in FIG. 4, the recreational vehicle is preferably a snowmobile, although a person skilled in the art will appreciate that the invention may be applicable to other types of recreational vehicles such as all-terrain vehicles.

Consistent with FIG. 1, FIG. 4 shows a snowmobile 10 with a chassis or frame 12, an engine 14 mounted to the chassis for driving an endless track 30 supported around a rear suspension system 28, a pair of handlebars 16 for steering the snowmobile via a pair of front skis 18, and, for each front ski, a front suspension system 20 in accordance with the present invention. The rear suspension system 28 comprises two parallel aluminum slide rails 28a, which generally position and guide the endless drive track 30 and which include idler wheels 30a engaged thereto. The slide rails 28a include a slide covering the lower surfaces thereof to reduce contact friction between the slide rails 28a and the endless track 30. The slide is preferably made of Ultra High Molecular Weight Polyethylene (UHMWPE). The rear suspension system 28 also includes one or more shock absorbers and coil springs. Forward and rear suspension arms of the rear suspension system 28 attach the slide rails 28a to the chassis 12.

At the front of the chassis 12, the snowmobile 10 comprises an external shell including fairings 11 that enclose the engine 14 to protect it, and which can be decorated to render the snowmobile 10 more aesthetically pleasing. Typically, the fairings 11 comprise a hood and one or more side panels. A windshield 15, which may be connected either to the fairings 11 or directly to the handlebars 16, acts as a wind deflector to lessen the force of the air on the rider when the snowmobile is moving. Two footrests 13, generally comprising part of a tunnel 12a, are also positioned on either side of the seat to accommodate the rider's feet.

Figure 5:
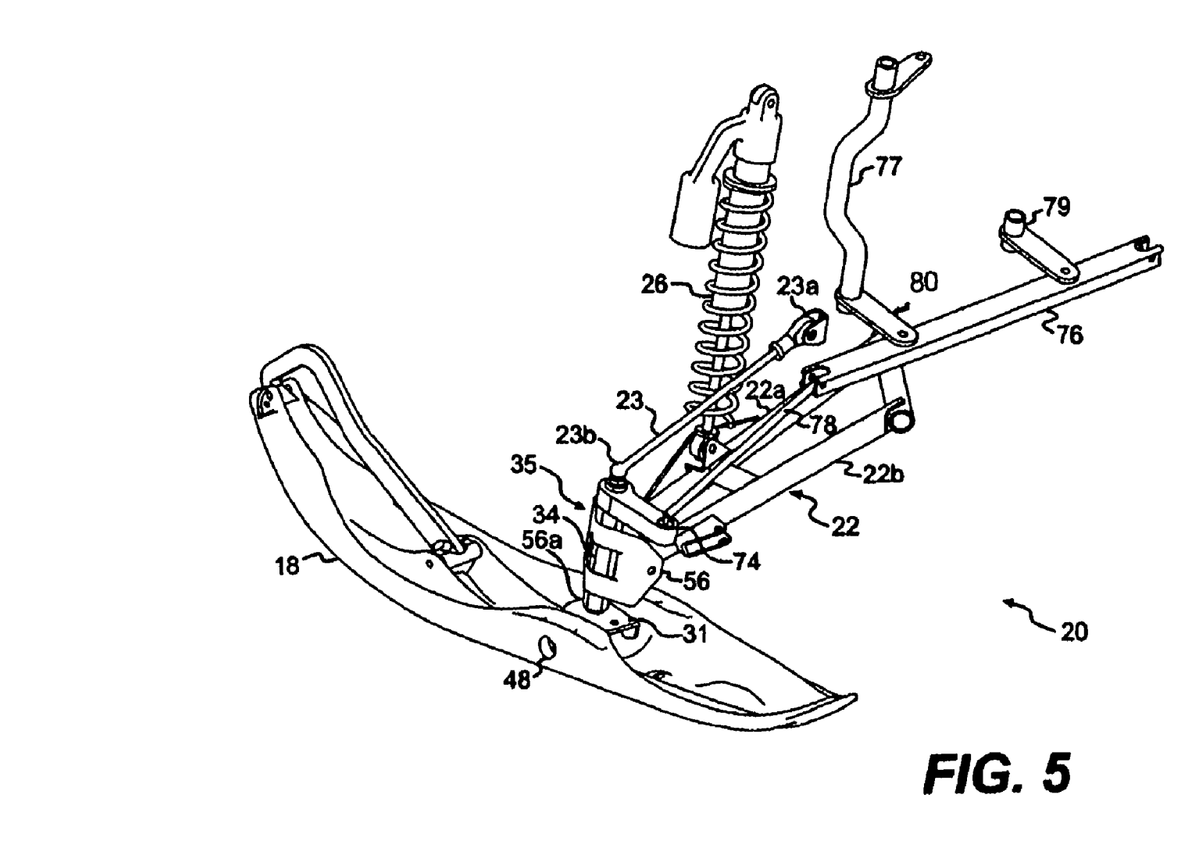
FIG. 5 is an isometric perspective view of an embodiment of a front suspension system in accordance with the present invention.

FIG. 5 is an isometric perspective view of the front suspension system 20 in accordance with the present invention. The front suspension system 20 links the chassis 12 to a ground-contacting portion which, in the case of a snowmobile, is a front ski assembly. The front ski assembly has a front ski 18 and an attachment mechanism, such as a bracket 31, for connecting the front ski 18 to a spindle assembly 35. The front ski 18 has a pair of holes 48 through which a spacer shaft (see FIG. 2) is inserted to affix the spindle assembly 35 to the front ski 18.

The spindle assembly 35 has a spindle holder 56 which has a tubular portion 56a for housing a spindle 34, as depicted in FIG. 5. The spindle 34 has splines at its top end so that the splines may engage with a star-shaped aperture in a steering arm 74. The steering arm 74 is pivotally connected to a rod 78 which in turn is connected to a steering linkage 76. The steering linkage 76 is connected to a steering shaft 77 via a pitman arm 80 and to a chassis pivot arm 79. The chassis pivot arm 79 is affixed to the chassis 12. The steering shaft 77 is connected to the handlebars 16 (not shown).

When a driver of the snowmobile 10 turns the handlebars 16, the steering shaft 77 rotates. Since the steering linkage 76 is restrained by the chassis pivot arm 79, the steering linkage 76 exerts a force on the steering rod 78 which in turn causes the steering arm 74 to rotate about the longitudinal axis of the spindle 34. Since the spindle 34 is splined to the steering arm 74, the spindle rotates as well, thereby causing the front ski 18 to turn.

Figure 6:
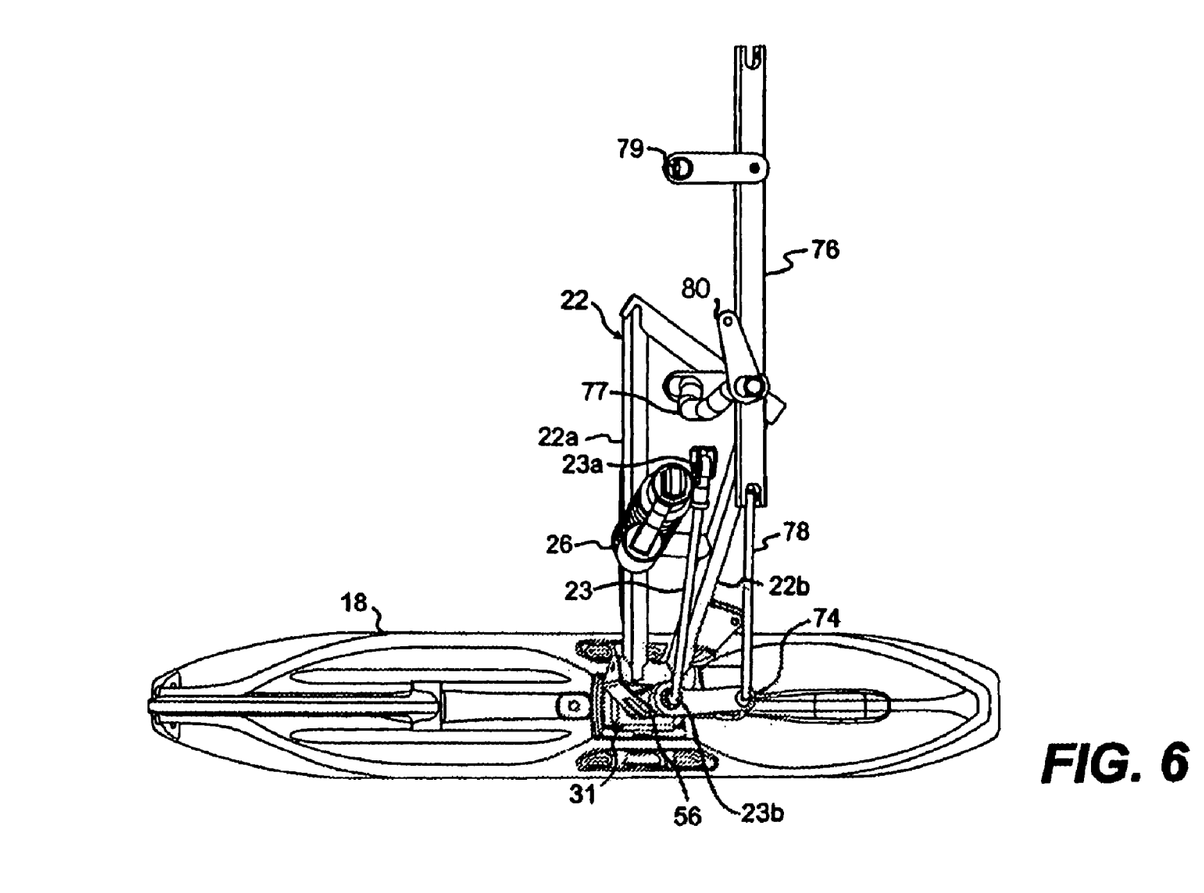
FIG. 6 is a top plan view of the embodiment of the front suspension system shown in FIG. 5.
Figure 7:
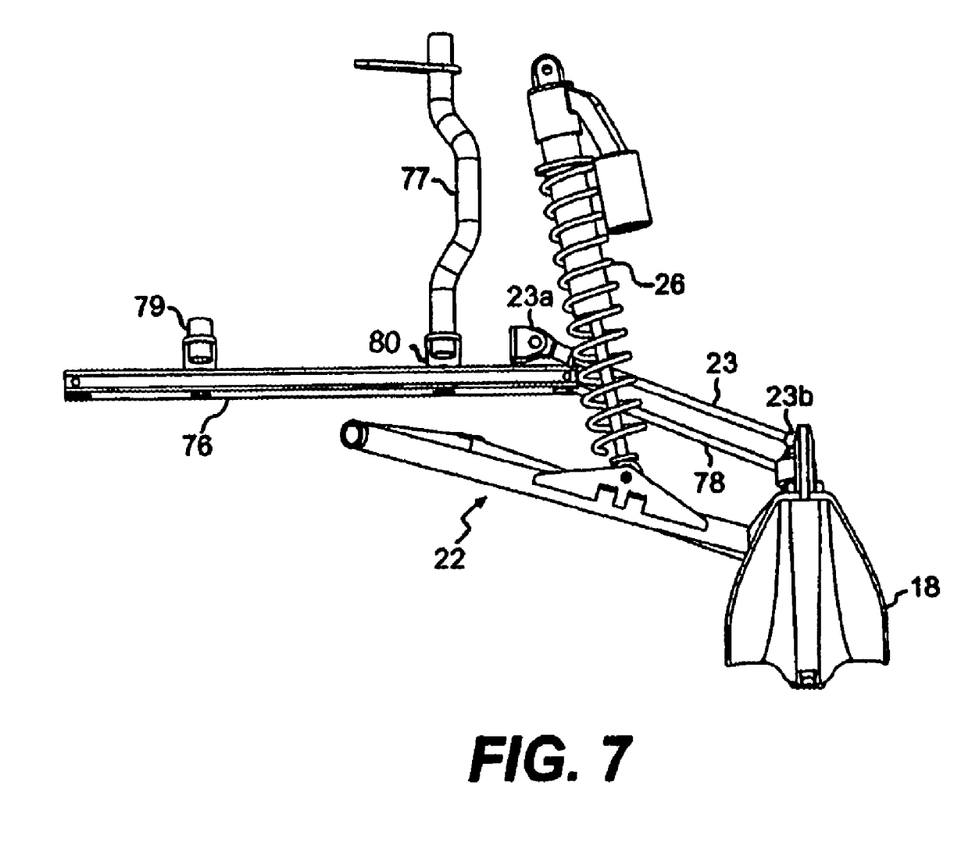
FIG. 7 is a front elevation view of the embodiment of the front suspension shown in FIG. 5.

As shown in FIGS. 5, 6 and 7, the spindle assembly 35 of the front suspension system 20 has a single A-arm assembly 22 and a lone (single) upper suspension arm 23.

The A-arm assembly 22 has a first member 22a and a second member 22b. The first and second members 22a, 22b of the A-arm assembly 22 are preferably of the same diameter and are made of steel or an alloy having a high elastic modulus. The first member 22a is pivotally connected at a proximal end to the chassis 12 and is pivotally connected at a distal end to the spindle assembly 35. The second member 22b is pivotally connected at a proximal end to the chassis 12 and is pivotally connected at a distal end to the spindle assembly 35.

Throughout this specification, the terms "proximal" and "distal" refer to the chassis. Thus, the proximal end is the end that is closer to the chassis whereas the distal end is the end that is farther away from the chassis.

At a proximal end, the upper suspension arm 23 is pivotally connected to the chassis 12 at a chassis pivot 23a. At a distal end, the upper suspension arm 23 is preferably connected via a ball joint 23b to a top of the spindle 34. Alternatively, the distal end of the upper suspension arm 23 may be connected via the ball joint 23b to the top of the spindle assembly 35. The upper suspension arm 23 is preferably a single rod of a smaller diameter than the first and second members 22a, 22b. Alternatively, the rod may be tubular or constructed from a lighter material having a lesser elastic modulus than that of the first and second members 22a, 22b of the A-arm assembly 22. The rod 23 need not be as strong as the first and second members of the A-arm assembly 22 because the loads exerted on the rod 23 are less than those exerted on the first and second members 22a, 22b of the A-arm assembly 22. Since most of the loads are lateral and front-to-back, a smaller and lighter upper suspension arm 23 is adequate to hold the spindle assembly 35 in a vertical orientation. The single A-arm assembly 22 is able to safely withstand the lateral and front-to-back loads exerted on the front suspension system 20. Although the upper suspension arm 23 is preferably a rod of smaller diameter than the first and second members 22a, 22b of the A-arm assembly 22, the upper suspension arm 23 may also be of the same diameter and material as the first and second members 22a, 22b of the A-arm assembly 22.

As shown in FIGS. 5, 6, and 7, a shock/spring assembly 26 (having a shock absorber and a coil spring) is pivotally attached at a bottom end to the first member 22a of the A-arm assembly 22 while a top end of the shock/spring assembly 26 is pivotally attached to the chassis 12. Alternatively, the shock/spring assembly 26 may be pivotally attached to the spindle assembly 35.

Figure 8:
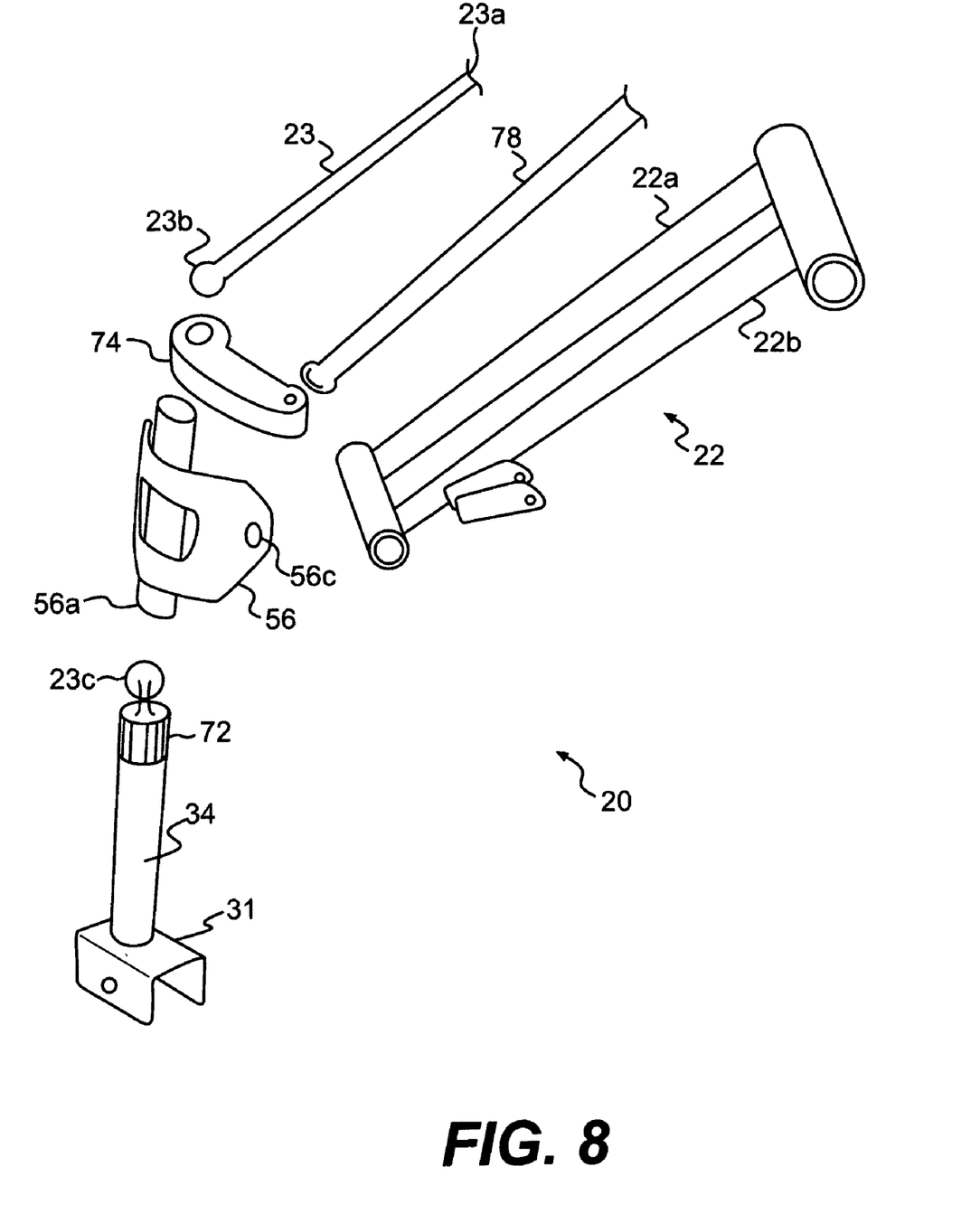
FIG. 8 is an exploded perspective view of the embodiment of the front suspension shown in FIG. 5.

The design of the front suspension system 20 is further described with reference to FIG. 8. In this exploded perspective view, the front suspension system 20 has a lower A-arm assembly 22 (including a first member 22a and a second member 22b) and an upper suspension arm (or radius rod) 23. The upper suspension arm 23 has a proximal end 23a for pivotal connection to the chassis and a distal end 23b which connects to a ball joint 23c. A spindle 34 has a base bracket 31 for connection to a front ski. The spindle 34 has splines 72 at a top end. Affixed to the top surface of the spindle 34 is the ball joint 23c. A spindle holder 56 having a tubular sleeve 56a houses the spindle 34 and has a pivotal attachment point 56c for the lower A-arm assembly 22. A star-shaped aperture in the steering arm 74 meshes with the splines 72. The steering arm 74 connects at an offset point to a steering rod 78.

Figure 9:
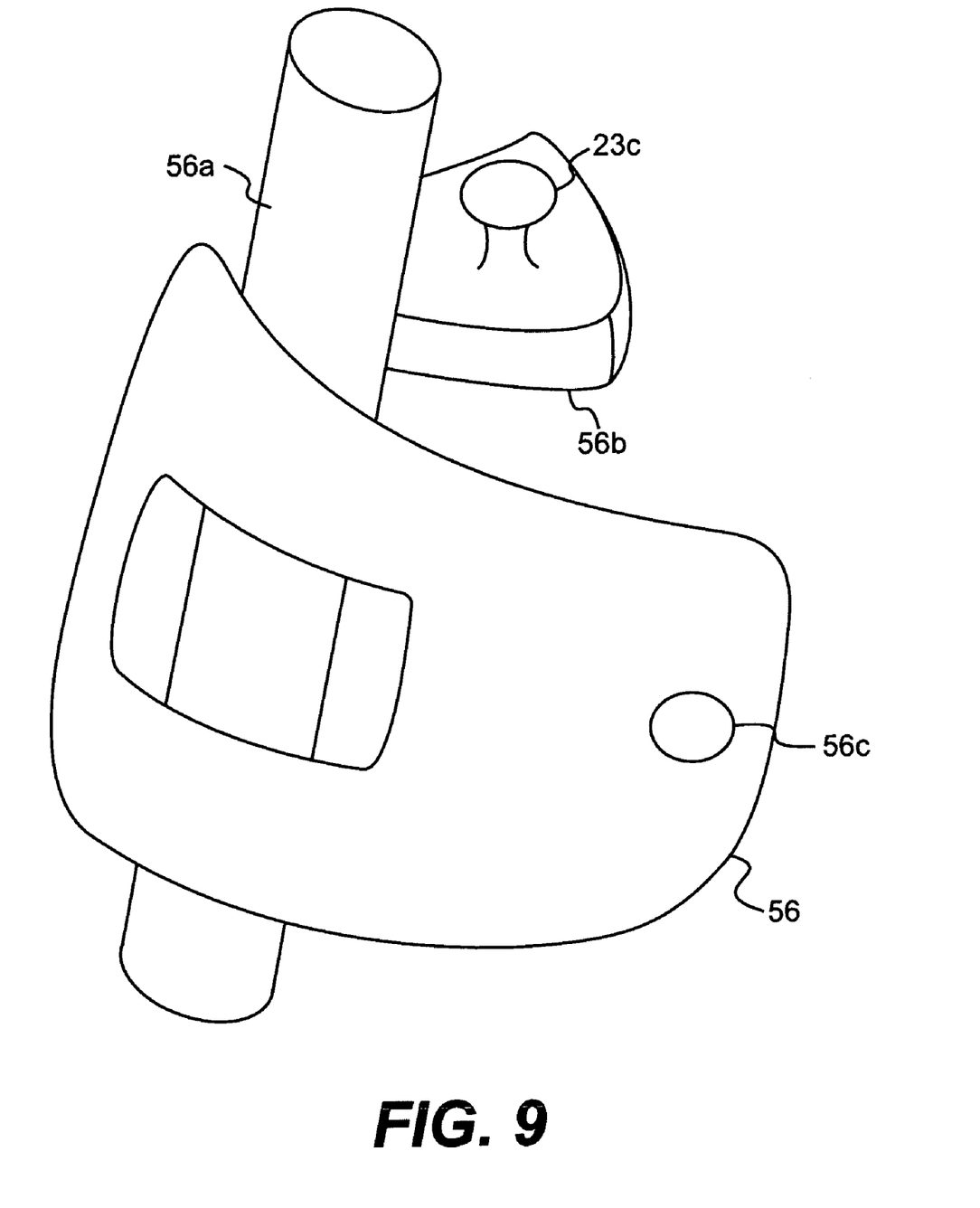
FIG. 9 is a perspective view of an alternative embodiment of the front suspension in accordance with the present invention.

In an alternative embodiment, depicted in FIG. 9, the front suspension system uses a different type of spindle holder 56. The spindle holder 56 has its ball joint 23c affixed not to the top of the spindle 34 as in FIG. 8 but rather to an extension surface 56b. The extension surface 56b is preferably welded to the tubular sleeve 56a. The ball joint 23c is oriented upwardly to facilitate connection to the distal end 23b of the upper suspension arm 23. This alternative embodiment may be used where there are vertical spacing restrictions in the front suspension.

With regard to both of the foregoing embodiments, a person skilled in the art will appreciate that a pivot joint may be used in lieu of the illustrated ball joint 23c.

Because the upper suspension arm 23 is but a single rod of smaller diameter than the A-arm members, the front suspension system 20 is light, easy to manufacture and inexpensive.

Furthermore, the simple yet versatile design of the front suspension system 20 permits a person skilled in the art to modify the position and orientation of the A-arm assembly 22 to achieve different ride dynamics. The A-arm assembly 22 can be attached to the chassis 12 at a different angle than what is shown in FIG. 7 so as to permit the front ski 18 to move back and forth in the travel direction when a bump is encountered. Lateral movement of each front ski 18 (known as "scrub") may also be adjusted by varying the lengths of the upper suspension arm 23 and the first and second A-arm members 22a, 22b. A person skilled in the art will readily appreciate that in certain applications, a few millimeters of scrub is desirable whereas in other applications, scrub is preferably eliminated altogether.

The embodiments of the invention described above are therefore intended to be exemplary only. The scope of the invention is intended to be limited solely by the scope of the appended claims.

What is claimed is:

1. A snowmobile comprising:
   a chassis including a tunnel;
   an engine disposed on the chassis;
   a drive track disposed below and supported by the tunnel and operatively connected to the engine for propulsion of the snowmobile;
   left and right suspensions, each suspension comprising:
      a spindle assembly,
      a lower A-arm having first and second members rigidly connected to each other such that the first and second members pivotally connect to the spindle assembly at distal ends, and the first and second members pivotally connected to the chassis at proximal ends, wherein the proximal end of the first member is further from the pivotal connection between the first and second members with the spindle assembly, than the proximal end of the second member is from the pivotal connection between the first and second members with the spindle assembly in a lateral direction, and wherein the first member is in front of the second member with respect to the forward direction of travel of the snowmobile; and two skis operatively connected to the chassis, one via each suspension, for steering the snowmobile.

2. The snowmobile of claim 1, wherein each ski has a front end and a rear end and the proximal ends of the first member and the second member are between the front and rear ends of the ski when viewed from above.

3. The snowmobile of claim 2, wherein the first member is longer than the second member.

4. The snowmobile of claim 3, wherein each left and right suspension further comprises a spindle having a first end and a second end, the ski being pivotally connected to the first end of the spindle, and the first and second members being pivotally connected relative to the spindle between the first and second ends of the spindle above the ski.

5. A snowmobile comprising:
a chassis including a tunnel;
an engine disposed on the chassis;
a drive track disposed below and supported by the tunnel and operatively connected to the engine for propulsion of the snowmobile;
left and right suspensions, each suspension having,
a spindle assembly,
a lower A-arm having a first member and a second member, the first and second members pivotally connected to the spindle assembly at distal ends, the first and second members pivotally connected to the chassis at proximal ends, the proximal ends of the first and second members being distanced from the pivotal connection of the first and second members with the spindle assembly such that the pivotal connection of the lower A-arm with the chassis is angled with the forward direction of travel of the snowmobile, and
two skis operatively connected to the chassis, one via each suspension, for steering the snowmobile in at least a forward direction of travel.

6. The snowmobile of claim 5, wherein each ski has a front end and a rear end and the proximal ends of the first member and the second member are between the front and rear ends of the ski when viewed from above.

7. The snowmobile of claim 6, wherein the first member is in front of the second member in a forward direction of travel of the snowmobile.

8. The snowmobile of claim 7, wherein the first member is longer than the second member.

9. The snowmobile of claim 8, wherein each left and right suspension further comprises a spindle having a first end and a second end, the ski being pivotally connected to the first end of the spindle, and the first and second members being pivotally connected relative to the spindle between the first and second ends of the spindle above the ski.

10. A snowmobile comprising:
a chassis including a tunnel;
an engine disposed on the chassis;
a drive track disposed below and supported by the tunnel and operatively connected to the engine for propulsion of the snowmobile;
left and right suspensions, each suspension having,
a lower suspension arm having a first member rigidly connected to a second member such that distal ends of the first and second members pivot with respect to the ski at a common point above the ski, and the first and second members pivot with the chassis at proximal ends thereof such that the pivotal axis of the lower suspension arm with the chassis is angled with the forward direction of travel of the ski, and two skis operatively connected to the chassis for steering the snowmobile, one via each suspension, each ski having a forward direction of travel when the snowmobile is traveling in a straight line.

11. The snowmobile of claim 10, wherein each ski has a front end and a rear end and the proximal ends of the first member and the second member are between the front and rear ends of the ski when viewed from above.

12. The snowmobile of claim 11, wherein the first member is in front of the second member in a forward direction of travel of the ski.

13. The snowmobile of claim 12, wherein the first member is longer than the second member.

14. The snowmobile of claim 13, wherein each left and right suspension further comprises a spindle having a first end and a second end, the ski being pivotally connected to the first end of the spindle, and the first and second members being pivotally connected relative to the spindle between the first and second ends of the spindle above the ski.

15. A snowmobile comprising:
a chassis including a tunnel;
an engine disposed on the chassis;
a drive track disposed below and supported by the tunnel and operatively connected to the engine for propulsion of the snowmobile;
a front suspension having,
a spindle rotatable about an axis, the spindle having a top end and a bottom end;
a ski connected to the bottom end of the spindle;
a lower A-arm having a first member and a second member, each member having a proximal end, the first and second members being rigidly connected to each other, each of the members pivotally connected to the chassis at the proximal end;
a chassis pivot arm pivotally attached to the chassis; and
a steering linkage pivotally connected at a first end to the spindle and at a second end to the chassis pivot arm,
wherein the chassis pivot arm is distanced, in the lateral direction, further from the proximal end of the first member than from the proximal end of the second member, and
wherein the first member is in front of the second member in a forward direction of travel of the ski.

16. The snowmobile of claim 15, wherein the ski has a front end and a rear end, the proximal ends of the first member and the second member being between the front and rear ends of the ski.

17. The snowmobile of claim 16, wherein the first member is longer than the second member.

18. The snowmobile of claim 17, wherein each left and right suspension further comprises a spindle having a first end and a second end, the ski being pivotally connected to the first end of the spindle, and the first and second members being pivotally connected between the first and second ends of the spindle above the ski.

19. A snowmobile comprising:
a chassis including a tunnel;
an engine disposed on the chassis;
a drive track disposed below and supported by the tunnel and operatively connected to the engine for propulsion of the snowmobile;

left and right suspensions, each suspension comprising:
- a lower suspension arm having a first member and a second member, each member having a proximal end, the first and second members being rigidly connected to each other, each of the members pivotally connected to the chassis at the proximal end;
- an upper suspension arm pivotally connected at a proximal end to the chassis and at a distal end to a spindle via a ball joint, the ball joint being distanced, in the lateral direction, further from the proximal end of the first member than from the proximal end of the second member, and
- two skis operatively connected to the chassis, one via each suspension, for steering the snowmobile.

20. The snowmobile of claim 19, wherein the ski has a front end and a rear end, the proximal ends of the first member and the second member being between the front and rear ends of the ski.

21. The snowmobile of claim 20, wherein the first member is in front of the second member in a forward direction of travel of the ski.

22. The snowmobile of claim 21, wherein the first member is longer than the second member.

23. A snowmobile comprising:
- a chassis including a tunnel;
- an engine disposed on the chassis;
- a drive track disposed below and supported by the tunnel and operatively connected to the engine for propulsion of the snowmobile;
- a front suspension having,
  - a spindle rotatable about an axis, the spindle having a top end and a bottom end;
  - a ski connected to the bottom end of the spindle;
  - a lower A-arm having a first member and a second member rigidly connected to each other such that distal ends of the first and second members pivot with respect to the ski at a common point above the ski, each of the members pivotally connected to the chassis at a proximal end;
- a steering column;
- a pitman arm fixed to the steering column; and
- a steering rod pivotally connected at a first end to the spindle and operatively connected at a second end to the pitman arm,
- wherein the pitman arm is distanced, in the lateral direction, further from the proximal end of the first member than from the proximal end of the second member.

* * * * *